(12) United States Patent
Matolak

(10) Patent No.: US 7,672,453 B1
(45) Date of Patent: Mar. 2, 2010

(54) DATA ENCRYPTION BY NONLINEAR TRANSFER FUNCTION

(75) Inventor: David William Matolak, Athens, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 224 days.

(21) Appl. No.: 09/642,373

(22) Filed: Aug. 21, 2000

(51) Int. Cl.
*H04K 1/02* (2006.01)
*H04L 9/06* (2006.01)
(52) U.S. Cl. .......................... 380/35; 380/263; 380/265
(58) Field of Classification Search .................... 380/35, 380/265, 263, 255; 714/746, 748, 752
See application file for complete search history.

(56) References Cited

U.S. PATENT DOCUMENTS 4,447,672 A * 5/1984 Nakamura ................... 380/264
5,010,553 A * 4/1991 Scheller et al. ............. 714/751
5,101,432 A 3/1992 Webb .......................... 380/33
6,137,843 A * 10/2000 Chennakeshu et al. ...... 375/340
6,704,420 B1 * 3/2004 Goedgebuer et al. ........ 380/263

\* cited by examiner

*Primary Examiner*—Matthew Smithers
(74) *Attorney, Agent, or Firm*—Duane Morris LLP

(57) ABSTRACT

A communication system includes an encryptor and a decryptor. For improved encryption security, the encryptor includes a multitap delay line to produce mutually delayed samples of the signal to be encrypted. Each sample is operated on by a key or function to produce modified signal samples, and the modified signal samples are summed or combined to produce the encrypted signal. According to one aspect of the invention, at least one of the keys or functions includes a nonlinear function. In some embodiments, the functions are time-variant for improved security. Decryption is accomplished in some embodiments by an equalizer. The preferred equalizer is the maximum-likelihood-sequence estimators matched to the encryption functions. A Viterbi algorithm makes it easy to implement the matched equalizer.

15 Claims, 5 Drawing Sheets

| - - - - | ASTERISKS : INPUT |
|---|---|
| —— | SQUARES : OUTPUT |

TABLE 1. SIMULATION RESULTS FOR THE TWO-TAP EXAMPLE.

| CASE | RECEIVER TYPE | SYMBOL ERROR PROBABILITY $P_s$ |
|---|---|---|
| 1 | 1. "MATCHED" VA | 0 |
| 2 | 2. "UNMATCHED" VA, WITH CHANNEL COEFFICIENTS $w_0= 0.8$, $w_1 = 0.6$ (ASSUMES A LINEAR DISTORTION) | 0.251 |
| 3 | 2. "UNMATCHED" VA, WITH CHANNEL COEFFICIENTS EQUAL TO LS ESTIMATES OVER 100 KNOWN SYMBOLS, w= [0.8157−0.019j, 0.1081 + 0.0402j] (ASSUMES A LINEAR DISTORTION) | 0.091 |
| 4 | 3. LINEAR EQ, WITH (3) COEFFICIENTS EQUAL TO LS ESTIMATES OVER 100 KNOWN SYMBOLS, w= [0.8201−0.0166j, 0.114 + 0.0272j, −0.0513−0.02264j] | 0.058 |
| 5 | 3. LINEAR EQ, WITH (7) COEFFICIENTS EQUAL TO LS ESTIMATES OVER 100 KNOWN SYMBOLS, w= [0.8382 − 0.0134j, 0.0964 + 0.0427j, −0.0827− 0.0399j, −0.0191−0.0243j, 0.1069 + 0.0523j, −0.0129 + 0.0910j, 0.0346 − 0.0394j] | 0.18 |
| 6 | 3. LINEAR EQ, WITH (11) COEFFICIENTS EQUAL TO LS ESTIMATES OVER 100 KNOWN SYMBOLS, w= [0.8372 + 0.0362j, 0.0881 − 0.0258j, −0.0700 + 0.0860j, 0.0001 + 0.0368j, 0.1330 − 0.0748j, −0.0013− 0.0995j, 0.0405 + 0.0099j, 0.1328 − 0.0366j, 0.0506 + 0.0960j, 0.0420−0.0022j, 0.0552−0.0444j] | 0.222 |

FIG. 6

DATA ENCRYPTION BY NONLINEAR TRANSFER FUNCTION

FIELD OF THE INVENTION

This invention relates to encryption of digital data signals, and more particularly to encryption by nonlinear-impulse-response filters.

BACKGROUND OF THE INVENTION

Most data encryption systems operate on the binary data produced by the data source. The data may be encoded for error detection andor correction before or after the encryption. The encryption is often performed by scrambling the data sequence with a "key" data sequence in order to conceal the original data sequence. Attempts may be made to alter the statistics of the encoded signal to make the signal appear more like random noise. After the encryption, the encrypted signal may be transmitted over a data path, or stored in a storage medium for later use. The transmission over a data path or storage may be viewed as a "channel" by which the encrypted signal is made available at a different time or venue. In any case, conventional digital signal processing techniques appropriate for the channel in question are used to aid in the transmission over the channel. Such techniques may include framing/packetizing, interleaving, modulating, filtering, and amplification. At the receiving end of the channel, the reverse operations are performed, in order to retrieve the original binary sequence.

An unauthorized or unintended entity which gains access to the encrypted signal by interception from the channel can apply various techniques to the encrypted signal, in an attempt to extract the original binary sequence.

U.S. Pat. No. 5,101,432, issued Mar. 31, 1992 in the name of Webb, describes a digital signal encryption technique in which the encryptor is a finite-impulse-response (FIR) network in which the impulse response is varied in time as the signal is encrypted, so that the impulse response "rolls" between different values during encryption. As described therein, the FIR network encrypts the signal by transforming with a substantially continuous nonlinear complex function of frequency, or in other words it disperses the original signal in time. This dispersion results in irregular "random-appearing" variations in amplitude of the signal. The random-appearing variations are not random, however, but arise from the time dispersion. The magnitude and possibly the phase spectra of the transformed signal are then complicated non-linear functions of frequency. Time dispersion as suggested by Webb implies distortion in the frequency domain. The time dispersion which Webb imposes on the signal during encryption is "inverted" by a decrypting filter.

Improved signal encryption/decryption techniques are desired.

SUMMARY OF THE INVENTION

The present invention, in general, uses nonlinear transformations of one or more sets of delayed signal samples to achieve encryption. These delayed samples may be further nonlinearly combined before submission of the combined signals to the transmission process. The nonlinear transformations can be selected so as to distort the signal spectrum or not, depending upon the type of encryption desired. The nonlinear transformations are particularly useful in the context of communications which are broadcast or which take place over wireless channels, as the effect of one form of the encryption is similar to that of "fading" of the channel, and preferably rapid fading, thereby masking the fact that the transmission is encrypted.

A method according to an aspect of the invention, for encrypting and decrypting digital data for transmission over a channel, includes the step of delaying the digital data by at least one delay increment, to thereby generate a plurality of time-sequential signal samples. Where there is but a single delay, two mutually time-sequential samples are available, and more mutually time-delayed samples are available with more delay elements. According to a mode of the method, a set of distortion keys are provided, which set includes at least one key which has a nonlinear transfer function. The key having a nonlinear transfer function may be one (or more) of (a) sin x; (b) cos x; (c) exp $(j*\pi*M(k))$; where $M(k)$ is a conventional scrambling sequence; (d) {sum of $[a_i*x^i]$}, where the $a_i$ are complex constants, which may be variant in time, or not variant in time; and (e) sgn(x), where sgn(x)=1 if x>0 and sgn(x)=−1 if x≦0. Each of the time-sequential signal samples is operated on by one of the keys which is a nonlinear transfer function, to thereby generate, at any instant, a plurality of distorted samples of the signal. The plurality of distorted samples of the signal is (or are) summed or nonlinearly combined, to thereby generate a distortion-encrypted signal. The distortion-encrypted signal is applied to an input of the channel over which the information is to be transmitted. The distortion-encrypted signal is extracted from an output of the channel', to form an extracted distortion-encrypted signal. The extracted distortion-encrypted signal is decrypted.

According to one hypostasis, the method further includes, before the step of delaying the error-correction-encoded signal by at least one delay increment, the step of forward error correction encoding the digital data. In another hypostasis, the set of distortion encoding keys includes at least one nonlinear transfer function in which the coefficients of the nonlinear transfer function vary with time. In a particular variation of the method, the set of distortion encoding keys includes at least one nonlinear transfer function in which the coefficients of the nonlinear transfer function vary with time at a recurrence rate corresponding to the bit rate of the digital data.

In yet another mode of the method, the input of the channel is at a location which is distant from the output of the channel, and the channel comprises (a) a modulator coupled to the input of the channel, for modulating the distortion-encrypted signal onto at least one carrier signal and (b) a demodulator coupled to the output of the channel for extracting the distortion-encrypted signal from the at least one carrier signal, and the method further includes the step of performing modulation at the input of the channel, and performing demodulation at the output of the channel at the location remote from the input.

In another version of the method, the channel includes a storage medium, and the method further comprises the step of interposing a delay between the step of applying the distortion-encrypted signal to the input of the channel and the step of extracting the distortion-encrypted signal from the output of the channel. The step of interposing a delay may include the step of recording the distortion-encrypted signal onto a magnetic disk, and playing back the magnetic disk at a time later than the recording.

According to one mode of the method, the step of decrypting the extracted distortion-encrypted signal is performed by a method comprising maximum likelihood sequence estimation. The maximum likelihood sequence estimation may be accomplished by a Viterbi algorithm.

BRIEF DESCRIPTION OF THE DRAWING

FIG. 6 is a table listing some characteristics of different types of decryptors in the example of FIGS. 3 and 4.

DESCRIPTION OF THE INVENTION

Figure 1:
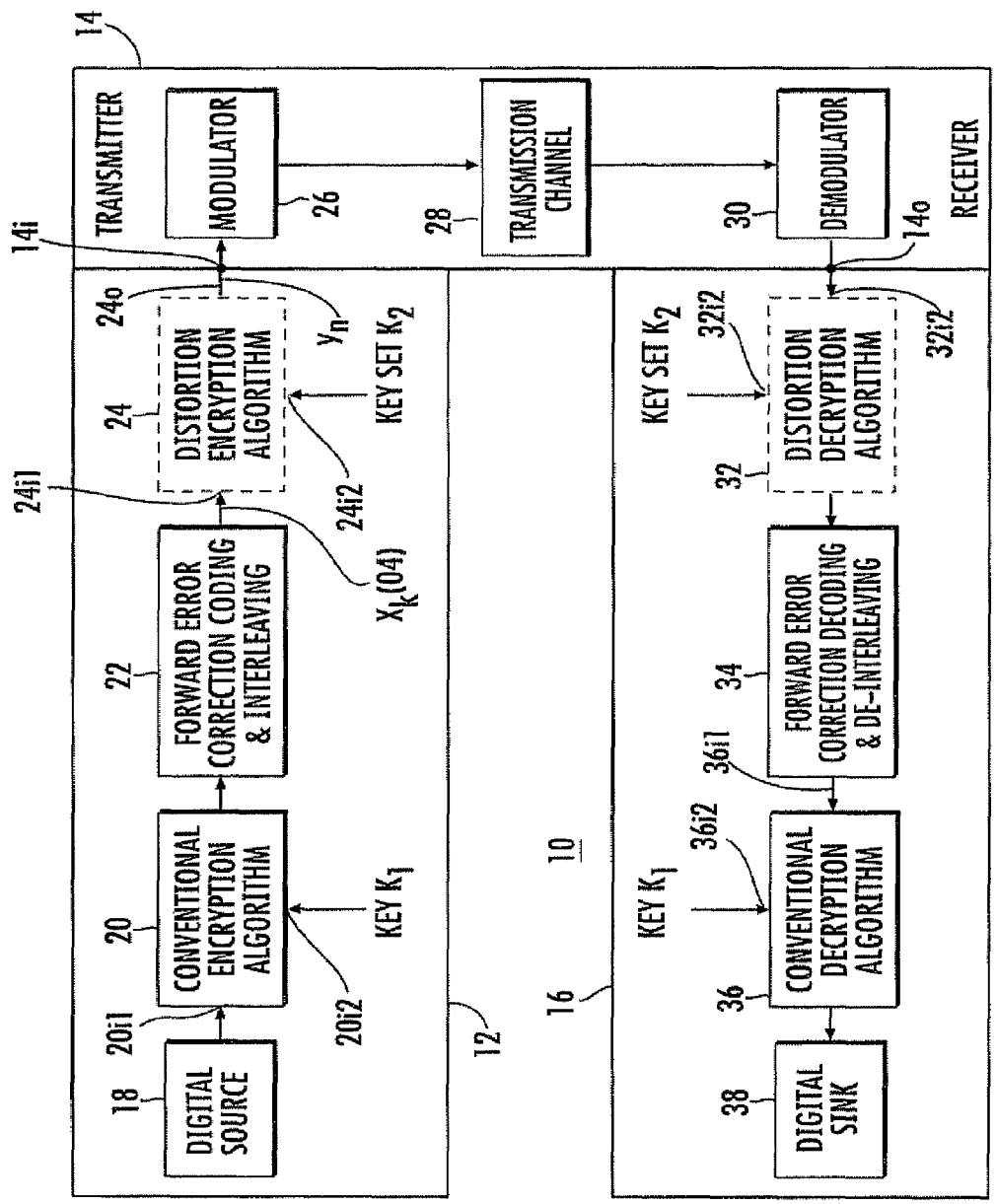
FIG. 1 is a simplified block diagram illustrating a system including a source of signal, an encryptor, a transmission channel, and a decryptor, showing placement of conventional encryption functions and of the encryption according to the invention.

In FIG. 1, a communication system 10 according to an aspect of the invention includes a source arrangement 12, a transmission channel 14, and a user or sink arrangement 16. In source arrangement 12, a source 18 of binary digital data representing the information to be transmitted to a data sink 38 is coupled to an input port 20$i$1 of a block 20. Block 20 may be an encryption arrangement which makes the binary sequence spectrum appear to be random or noise-like. Encryptor 20 also receives another binary "key" sequence $K_1$ at its input port 20$i$2. The encryptor may include a logical operation, such as an exclusive-OR, which scrambles the binary data sequence with the binary key sequence $K_1$. Encryption may also include permutation of data blocks. Such operations are used in the common DES standard, set forth in "Cryptography for the Internet," by Zimmerman, published in the October, 1998 issue of Scientific American. The binary data is applied from encryptor 20 to a forward error correction block 22, which represents the application of forward error correction and detection to the signal. The digital data, which may be designated $x_k(m)$, flows from block 22 to an input port 24$i$1 of a block 24, which represents distortion encryption according to an aspect of the invention, to form distortion encrypted digital data. The encryption performed in block 24 requires that a second key set $K_2$ be applied to a second input port 24$i$2. It should be noted that keys $K_2$ constitute a set, by contrast with the key $K_1$. The encrypted digital data is applied from output port 24$o$ of block 24 of source arrangement 12 to an input port 14$i$ of the transmission channel illustrated as block 14.

Transmission channel 14 of FIG. 1 may be as simple as a wire transmission path extending between its input port 14$i$ and an output port 14$o$, or it may be an optical path which includes electrooptical transmitters and receivers, or it may be a free-space electromagnetic path (radio, or the like) including a transmitter/modulator 26, path 28, and receiver/demodulator 30, all as known in the art. In any event, the encrypted digital data is transmitted from input port 14$i$ to output port 14$o$ of block 14. In the context of a radio path, channel 14 may have its input port 14$i$ and its output port 14$o$ spaced apart.

The received and demodulated encrypted digital data at output port 14$o$ of channel block 14 of FIG. 1 is applied to an input port 32$i$1 of a distortion decryptor block 32, together with a replica of key set $K_2$ applied to input port 32$i$2, to thereby distortion-decrypt the digital data. The digital data so distortion-decrypted is applied to an error detector and correction arrangement illustrated as a block 34, which produces corrected digital data, ideally identical to that produced by conventional encryption algorithm 20. The corrected digital data is applied to an input port 36$i$1 of a conventional decryptor 36, together with key $K_1$ applied to input port 36$i$2, to decrypt the signal to binary form. The binary form is ideally identical to the binary signal produced by digital source 18. The decrypted binary signal is applied from decryptor 36 to a user, represented as sink 38.

The basic encryption according to an aspect of the invention is to apply nonlinear distortion to the signal before it is transmitted over the channel, whether that channel be a wire connection or a free-space path. The coefficients which produce the distortion are, generally speaking, functional operators performed on mutually delayed samples of the signal, and not simply constants by which the signal samples are multiplied, as in the Webb patent and in conventional digital filtering.

Figure 2:
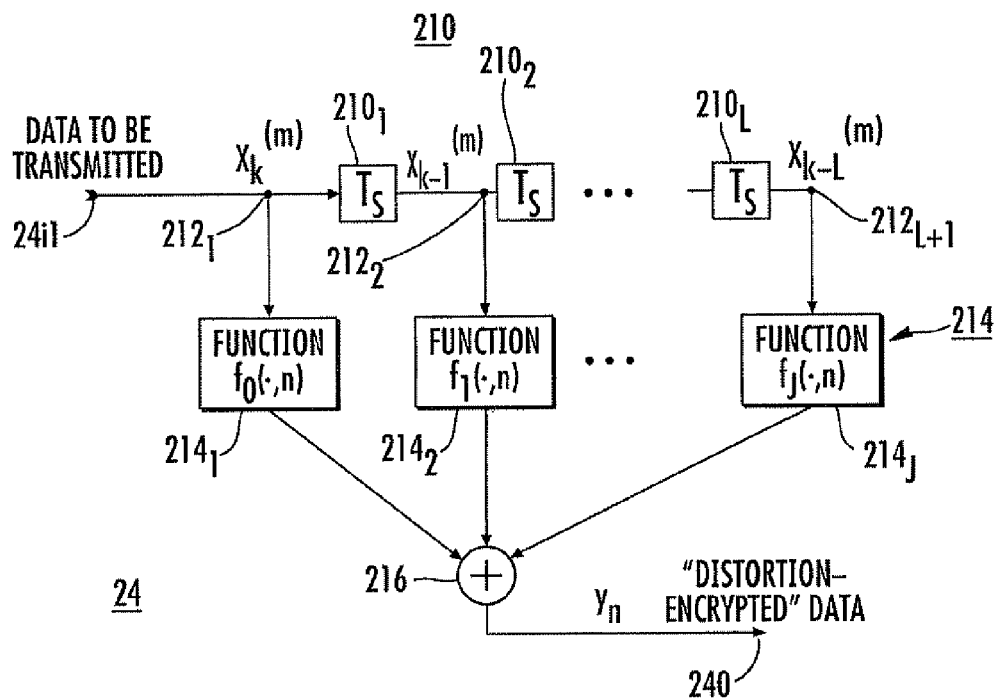
FIG. 2 is a simplified diagram illustrating details of the distortion encryption block of FIG. 1.

FIG. 2 illustrates an encryptor according to an aspect of the invention. In FIG. 2, the encryptor includes a tapped delay line 210 including a first delay element $210_1$, a second delay element $210_2$, . . . , and an $L^{th}$ delay element $210_L$, with an output taken before and after each delay element. More particularly, a tap $212_1$ precedes delay element $210_1$, a tap $212_2$ follows delay element $210_1$ and precedes delay element $210_2$, . . . , and a tap $212_{L+1}$ follows delay element $210_L$. The input signal or data to be transmitted $X_k(m)$, which can in general be a sequence of complex numbers, is applied to input port 24$i$1, and appears undelayed at tap $212_1$. The delay $T_S$ of each delay element of tapped delay line 210 is equal to the symbol sample duration of the applied signal. Thus, a stream or sequence of complex data enters tapped delay line 210 at a rate of once per $T_S$ seconds, where $T_S$ is the sample interval. The $k^{th}$ input symbol is denoted $x_k$, and input symbols are generated at a rate of one per $T_{sym}$ seconds. For simplicity, the description in the following sentence and paragraph assume that $T_S = T_{sym}$. Thus, at any time, the symbol at tap $212_1$ is $x_k$, and the symbol at tap $212_2$ is $x_{k-1}$ or zero, and the symbol at tap $212_{k-L}$ is $x_{k-L}$ or zero.

The current sample at each tap of FIG. 2 has a function performed on it by a functional block of a set 214 of key functions. More particularly, sample $x_k(m)$ at tap $212_1$ is modified by function $f_0(\bullet, n)$ in a block $214_1$, sample $x_{k-1}(m)$ at tap $212_2$ is modified by function $f_1(\bullet, n)$ in a block $214_2$, . . . , and sample $x_{k-L}(m)$ at tap $212_{L+1}$ is modified by function $f_J(\bullet, n)$ in a block $214_J$. The functions can in general be memoryless functions, meaning that they are incapable of dispersing the signal in time. However, some of the functions in blocks $214_1, 214_2, \ldots, 214_J$ may be dispersive. A salient feature of one aspect of the invention lies in that at least one of the functions is a nonlinear transfer function.

The mutually delayed, functionally-operated signals appearing at the output ports of blocks $214_1, 214_2, \ldots, 214_J$ are applied to the input ports of a summing or combining (+) circuit 216. The output signal of summing or combining circuit 216 is the distortion-encrypted output sequence $\{y_n\}$, emitted at the rate one symbol per $T_{sym}$ seconds at output port 240. This combining operation may also be nonlinear, e.g. $f_0 x_k * f_1 x_{k-1}$, where * represents multiplication.

In general, the sampling time $T_S$ discussed in conjunction with FIG. 2 will be the input symbol time $T_{sym}$ divided by a small positive integer m, such as m=1 or m=2, and so that the outputs occur at sampling times $$nT_S=(k/m)T_{sym} \quad (1)$$

When m is greater than one, there are m−1 zeroes between each actual symbol in the tapped delay line. The superscript "m" on the input sequence symbolizes this condition. There are J+1 taps in the delay line, and the number of symbols contained in the tapped delay line is L. From these conditions, we find that $$mL+1 \leq J \leq mL+m \quad (2)$$

For example, if m=2 and L=4, J must be either 9 or 10.

The use of a tapped delay line allows the encryptor according to the invention to be easily implemented with digital circuitry, and serves to introduce intersymbol interference, to thereby distort the input digital signal. The intersymbol interference is akin to that introduced by a dispersive (multipath or severely bandlimited) path or channel. For the strongest encryption, the intersymbol interference should be rapidly time varying, so that unintended or unauthorized receivers cannot acquire and "learn" the "coefficients."

In order to further improve the encryption to make unauthorized decryption more difficult, an aspect of the invention uses functional operations on each tap of the delay line. More specifically, on the $i^{th}$ tap, if the input is symbol $x_{k-r}(m)$, the output will be $f_r(x_{k-r}(m), n)$. This notation implies that the functions can change at each sampling time $nT_S$. The distortion encryptor output at time $nT_S$ is then described by $$y_n = \sum_{p=0}^{L} f_p(x_{k-p}^{(m)}, n) \quad (3)$$

These functions can be represented by any mathematical operation, if possible to implement, such as linear, quadratic, cubic, . . . transcendental.

The encryptor output as set forth in equation (3) represents the output of a discrete time dispersive channel with tap vector=$[f_0, f_1, \ldots, f_L]$ when the input is the sequence $\{x_k\}$, as set forth in J. G. Proakis, Digital Communications, $2^{nd}$ edition, McGraw-Hill, New York 1989. With such a signal, the appropriate recovery method is termed "equalization." Equalizers essentially attempt to undo the distortion introduced by the dispersive channel; with the overall goal of being the reliable estimation of the transmitted sequence $\{x_k\}$. Three types of equalizers are in common use, namely linear equalizers, decision feedback equalizers, and maximum-likelihood sequence estimators. For the purpose of decrypting the encrypted signals produced by the arrangements of FIGS. 1 and 2, the maximum likelihood sequence estimator (MLSE) is most effective. The MLSE requires knowledge of the channel coefficients (that is, the coefficients of the "dispersive channel," which is the described encryptor), and attains this knowledge through an estimation scheme. In general, the MLSE, must also have knowledge of L, the number of symbols contained in the delay line of the equivalent dispersive channel. Failure to make a good estimate of the coefficients of the dispersive channel results in mismatch of the MLSE to the encryption, which undesirably causes an estimated sequence $\{x_k\}$ having a high proportion of errors.

In the particular instance of encryption by functions, as described in conjunction with FIGS. 1 and 2, and as set forth in equation (3), rapid variation of the functions, as for example significant or appreciable variation over times less than or equal to $T_{sym}$, makes conventional MLSE very difficult. The difficulty increases as L increases, as the rate of change of the tap functions increases, and as the complexity of the tap functions increases. For decryption of signals encrypted by functions such as those described, which include functions which have nonlinear transfer characteristics, decryption, according to an aspect of the invention, is by MLSE matched to the known distortion encryptor. The MLSE is easily implemented by the Viterbi algorithm (VA) described in G. D. Forney "*The Viterbi Algorithm*", IEEE Proceedings, vol. 61, pp 268-278, March 1973. In the decryptor block 32 of FIG. 1, the key set $K_2$ applied to input port 32i2 includes values of length parameters L and J, the sampling time $T_S$ relative to the symbol time $T_{sym}$, and the set of tap functions $f_i(\bullet,n)$ for all time n. Naturally, the decryptor must be synchronized with the encrypted signal. This synchronization may be accomplished in conventional manner, by the use of a known training preamble pattern preceding the actual information signal.

Figure 3:
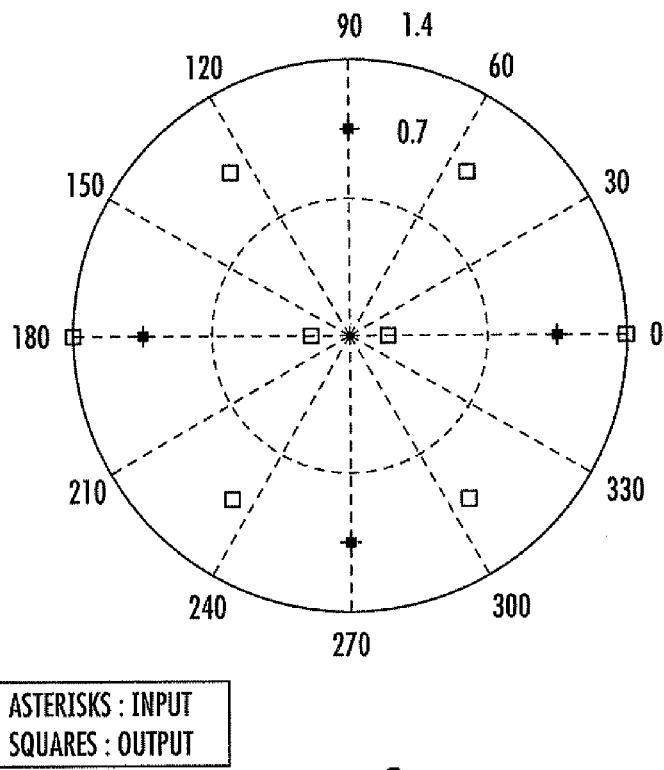
FIG. 3 is a representation of a signal constellation of input and output signals of a two-tap encryptor according to an aspect of the invention in a QPSK context.
Figure 4:
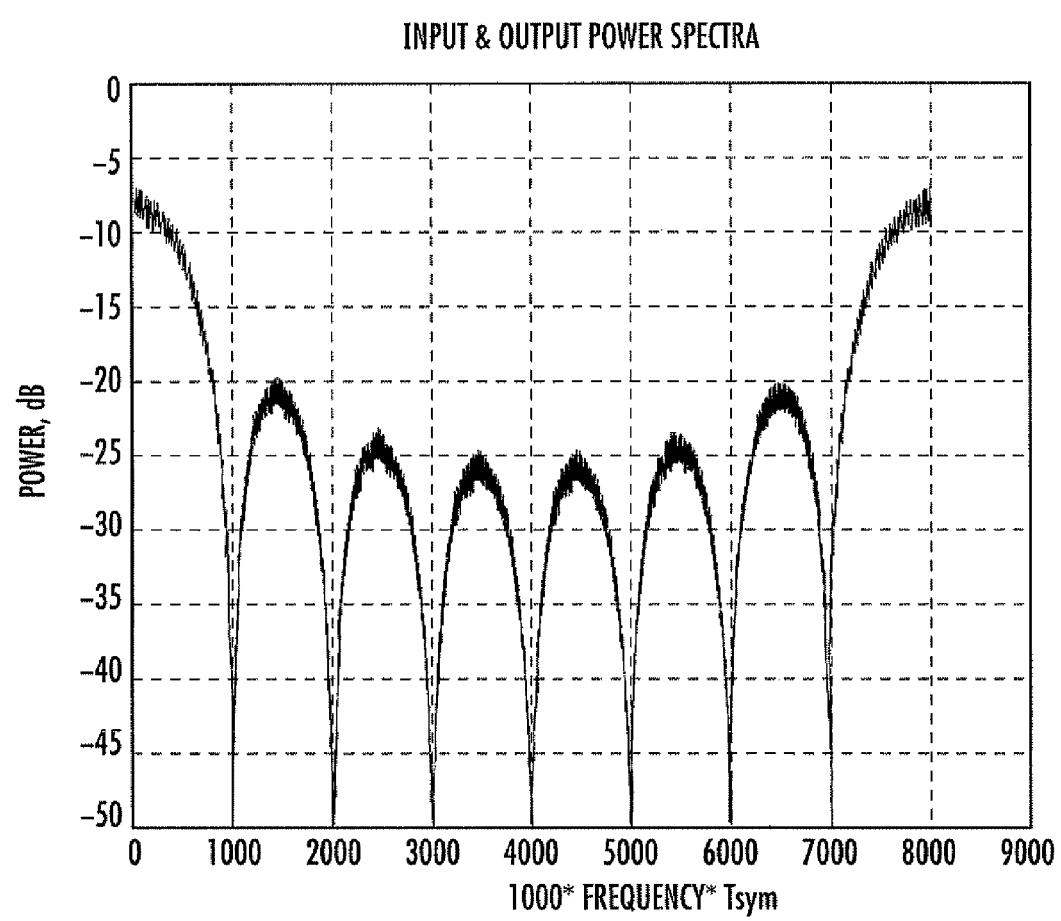
FIG. 4 is a power spectrum of input and output signals of the encryptor of FIG. 3.

A simulation of a communication system according to the invention was tested with the following parameters:

m=1 ($T_S=T_{sym}$ and n=k);
L=J=1 (corresponding to a single delay element);
$f_0(x_k,n)=f_0(x_k)=0.8x_k$; and
$f_1(x_{k-1},k)=f_1(x_{k-1})=0.6(x_{k-1})^2$ which are not time-varying functions, but which includes a nonlinear transfer $f_1$. The input sequence $\{x_k\}$ for this simulation was an uncorrelated quaternary phase-shift-keyed (QPSK) symbol sequence of unit magnitude, with symbols $x_k$ equal to $e^{j\theta\kappa}$ with $\theta_{ek}$ in the set (0, π/2, π, 3π/2). Blocks of 1000 symbols each were encrypted and transmitted. FIG. 3 is an illustration of the input and output signal constellation. In FIG. 3, the input signal points are represented by asterisks, and the output signal points are illustrated by squares. The squaring operation does not produce any spectral lines, since the output constellation is zero mean, in that all symbols have equal probability. FIG. 4 illustrates input and output power spectra. The input and output spectra of FIG. 4 are indistinguishable, and therefore FIG. 4 does not explicitly evince encryption. The power spectrum of FIG. 4 was obtained by averaging 100 independent blocks, each having sample vectors of 1000 symbols each. The input and output power spectra are essentially identical, so the distortion encryption operation has no effect on the transmitted signal spectrum in this particular case. For encryption which is most difficult to decrypt, a distorted spectrum may be desirable.

Figure 5:
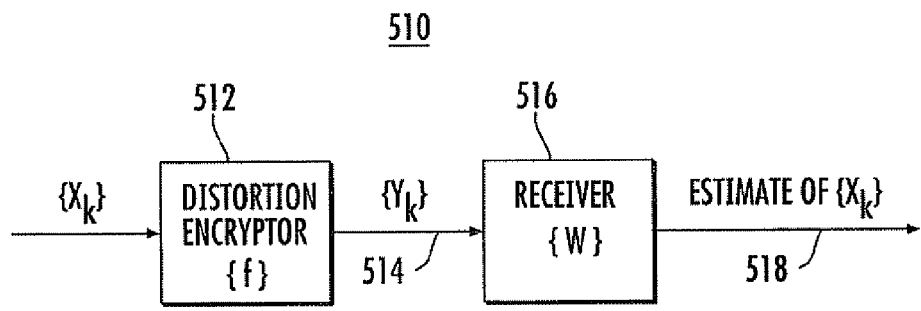
FIG. 5 is a simplified block diagram of a communication path including an encryptor and decryptor according to an aspect of the invention, in the context of a noise-free transmission channel.

FIG. 5 is a simplified block diagram of a cascade 510 of a distortion encryptor 512 according to an aspect of the invention, which distortion encrypts source signals $\{x_k\}$ to produce distortion encrypted signal $\{y_k\}$ on a path 514, cascaded with a receiver 516 which produces an estimate of the sequence of source signal $\{x_k\}$ on output path 518. The arrangement of FIG. 5 provides a basis for analyzing the performance of various receivers 516. The table of FIG. 6 lists the symbol error probability $P_S$ for five different distortion-encryptor/receiver combinations, termed "cases." Case number 1 of the table of FIG. 6 is for a matched Viterbi Algorithm (designated 1), which may be viewed as representing the "authorized" decryptor. From FIG. 6, the value of $P_S$ is zero, which represents perfect errorless decryption.

Cases 2 and 3 of the table of FIG. 6 represent unmatched Viterbi Algorithms (designated by the number 2) that assume a linear channel. For these unmatched receivers, the coefficients are set to the optimum least-squares estimates of the coefficients, assuming that the receivers knew the first 100 transmitted symbols, as described in S. Haykin "*Adaptive Filter Theory*" $2^{nd}$ edition, Prentice-Hall, Englewood Cliffs, N.J., 1991, for ten sets of 1000 transmitted symbols, in the absence of channel noise. These least squared values are the ones which would minimize the sum of the squared errors between the filtered received sequence $\{y_k\}$ filtered by the receiver filter with coefficients $\{w_i\}$, i=(1, 2, ..., M) and the desired sequence $\{x_k\}$. The least-squares estimate is the best linear unbiased estimate, and represents the best that the unauthorized receiver could do if it knew the first 100 transmitted symbols $\{x_k\}$ and, used a linear filter. It should be understood that the unauthorized receiver will generally not know the first 100 transmitted symbols, and the transmitted sequence would ordinarily be of greater length than 1000 symbols.

Case number 2 of the table of FIG. 6 is for an unmatched Viterbi Algorithm decryptor in the situation in which an unauthorized decryptor might assume linear distortion, but does not know of the amplitude nonlinearity, in that it assumes that $f_0(x_k,k)=0.8x_k$ and that $f_1(x_{k-1},k)=0.6x_{k-1}$, with the application of channel coefficients $w_0=0.8$ and $w_1=0.6$. The coefficients used for the "unauthorized" receiver/decryptor in this case 2 were selected to equal the constant parts of the nonlinear functions employed in encryption, in order to more accurately model a real-world situation in which the constant parts might be correctly estimated. As set forth in the right column of the table of FIG. 6, $P_S$ has a value of 0.251 for this case, representing unusably high error in decrypting the encrypted signal $\{x_k\}$.

Case number 3 of the table of FIG. 6 is for a Viterbi Algorithm decryptor, in which the amplitude nonlinearity of the encrypting is similarly not recognized, but which uses the least-squares coefficients as determined over 100 symbols. The resulting error probability becomes 0.091, or almost 10%. Such a high error rate makes the Viterbi Algorithm decryptor relatively useless for generating a reliable estimate of the received symbols, even with coefficients selected on the basis of least-squares approximation with 100 known symbols. In the absence of the advantages of knowing the first 100 symbols, it seems unlikely that this decrypting scheme would be at all useful.

Cases 4, 5, and 6 of the table of FIG. 6 are for the situation in which the receiver 516 of FIG. 5 is a linear equalizer, which is less powerful for decrypting than the Viterbi Algorithms of cases 2 and 3. Case 4 is for a linear equalizer with three coefficients set equal to the least-squares estimates over 100 known symbols, and the resulting symbol error probability is 0.058. Comparing cases 3 and 4, it can be seen that the "unmatched" Viterbi algorithm performed worse than the simple linear equalizer; this illustrates the well-known sensitivity of MLSE to mismatch. Case 5 is for a linear equalizer with seven coefficients equal to least-squares estimates over 100 known symbols, and the resulting symbol error rate is 0.18. Case 6 is for a linear equalizer with eleven coefficients equal to the least-squares estimates over 100 known symbols, and the resulting symbol error rate is 0.222.

An unauthorized receiver or "eavesdropper," in order to decrypt a signal encrypted according to an aspect of the invention, must first identify the system as being one in which amplitude and/or phase nonlinearity is intentionally used. In a context in which fading may be expected, even this step may be difficult. In the absence of knowledge of the nonlinearity and the coefficients and/or functions which control it, the decoding must be done "blindly," as described by Lainiotis and Papaparaskeva "*A Partitioned Adaptive Approach to Nonlinear Channel Equalization*," IEEE Transactions on Communications, vol. 46, no. 10, pp 1325-1336, October 1998.

The invention differs from Webb's arrangement in that the invention uses a nonlinear transformation in the time domain, which can yield a linear transfer function in the frequency domain. By contrast, Webb's arrangement uses a linear transformation in the time domain to obtain nonlinear transfer functions in the frequency domain. The linear transfer function in the frequency domain can be advantageous in that it tends to disguise the encryption, or make it difficult to determine that encryption has taken place. As in the earlier example, for the case of a quaternary phase modulation (QPSK) input signal, the complex input symbols lie in the set $\{1, j, -1, -j\}$ where j=square root of (−1). The encryptor function $$y_n=0.8(X_n)+0.6(X_{n-1})^2$$

where:

$y_n$=the output at time n;

$X_n$=input at time n; and $X_{n-1}$=input at time n−1, yields an output power spectrum that is identical to that of the input. This means that the amplitude transfer function is unity. The same conclusion regarding the amplitude transfer function applies to any unit-magnitude input signal type, which is to say for any size phase modulation alphabet.

Figure 7:
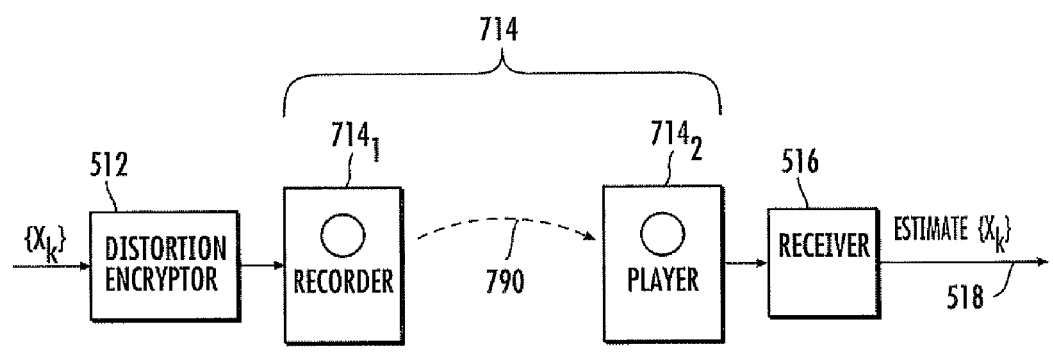
FIG. 7 is a simplified block diagram of a communication path similar to that of FIG. 5, which provides for the possibility of temporal movement or signal storage.

FIG. 7 is similar to FIG. 5, but includes a signal or information storage scheme for temporally storing the message transmitted over the channel. Note that the arrangement of FIG. 5 allows transmission only in the spatial context. In FIG. 7, signal $\{x_k\}$ is applied to distortion encryptor 512, which produces an encrypted signal. The encrypted signal is applied to a channel or transmission path designated generally as 714, from which the signal is applied to receiver 516. Receiver 516 produces an estimate of $\{x_k\}$ as described above on a path 518. Path 714 may include either a temporal movement, location movement, or both. As illustrated in FIG. 7, path 714 includes a recording device illustrated as 714, which receives the encrypted information, and stores the information on a storage medium. The medium stores the encrypted information, and after temporal movement (after a period of time) the recording may be replayed, for application directly to the receiver 516. Thus, if the receiver 516 is at the same site or location as the encryptor, there is no movement in space, and only movement in time has occurred. On the other hand, if the receiver 516 is at a distant location, the recording medium with the recorded message' may be physically transported over path 790 to a player illustrated as $714_2$ at a distant location, and replayed at that distant location for application to receiver 516, thus effectuating both temporal and spatial movement.

Other embodiments of the invention will be apparent to those skilled in the art. Should greater encryption security be desired, more taps could be used in the delay line, although the complexity of the authorized decryptor increases as $m^L$, where $m$ is the number of symbols in the transmitted symbol alphabet (four for QPSK), and L is the number of symbols in the delay line. Encryptor strength can also be increased by the use of time-varying functions or coefficients, such as, for example, $f_0(x_k,n)=r_{k1}x_k$ and $f_1(x_{k-1},n)=r_{k2}(x_{k-1})^2$, where $r_{k1}$ and $r_{k2}$ are complex Gaussian processes with a fairly large normalized Doppler spread, on the order of $F_D T_S=0.1$. Such random or pseudorandom processes are easily generated.

Thus, a communication system according to an aspect of the invention includes an encryptor and a decryptor. For improved encryption security, the encryptor includes a multitap delay line to produce mutually delayed samples of the signal to be encrypted. Each sample is operated on by a key or function to produce modified signal samples, and the modified signal samples are summed or combined to produce the encrypted signal. According to one aspect of the invention, at least one of the keys or functions includes a nonlinear function. In some embodiments, the functions are time-variant for improved security. Decryption is accomplished in some embodiments by an equalizer. The preferred equalizer is the maximum-likelihood-sequence estimators matched to the encryption functions. A Viterbi algorithm makes it easy to implement the matched equalizer.

More particularly, the present invention, uses nonlinear transformations of one or more sets of delayed signal samples to achieve encryption. These delayed samples may be further nonlinearly combined before submission of the combined signals to the transmission process. The nonlinear transformations can be selected so as to distort the signal spectrum or not, depending upon the type of encryption desired. The nonlinear transformations are particularly useful in the context of communications which are broadcast or occur over wireless paths or channels, as the effect of one form of the encryption is similar to that of "fading" of the channel, and preferably rapid fading, thereby masking the fact that the channel is encoded.

A method according to an aspect of the invention, for encrypting and decrypting digital data for transmission over a channel, includes the step of delaying ($210_1, 210_2, \ldots, 210_L$) the digital data ($x_k$) by at least one delay increment, to thereby generate a plurality of time-sequential signal samples (at taps $212_1, 212_2, \ldots, 212_{L+1}$). Where there is but a single delay, two mutually time-sequential samples are available, and more mutually time-delayed samples are available with more delay elements. According to a mode of the method, a set ($K_2$) of distortion keys are provided, which set includes at least one key which has a nonlinear transfer function. The key having a nonlinear transfer function may be one (or more) of (a) sin x; (b) cos x; (c) exp (j*π*M(k)), where M(k) is a conventional scrambling sequence; (d) {sum of [ai*x^i]}, where the ai are complex constants, which may be variant in time, or not variant in time; and (e) sgn(x). Each of the time-sequential signal samples is operated on by one of the keys which is a nonlinear transfer function, to thereby generate, at any instant, a plurality of distorted samples of the signal (at the output of set 214 of functions). The plurality of distorted samples of the signal is (or are) summed or combined (216), to thereby generate a distortion-encrypted signal ($y_n$). The distortion-encrypted signal is applied to an input of the channel (14, 514) over which the information is to be transmitted. The distortion-encrypted signal is extracted from an output of the channel (by demodulator 30, if necessary), to form an extracted distortion-encrypted signal. The extracted distortion-encrypted signal is decrypted.

According to one hypostasis, the method further includes, before the step of delaying the error-correction-encoded signal by at least one delay increment, the step of forward error correction (22) encoding the digital data. In another hypostasis, the set of distortion encoding keys ($K_2$) includes at least one nonlinear function in which the coefficients of the nonlinear function vary with time. In a particular variation of the method, the set of distortion encoding keys ($K_2$) includes at least one nonlinear function in which the coefficients of the nonlinear function vary with time at a recurrence rate corresponding to the bit rate ($T_S$) of the digital data.

In yet another mode of the method, the input (14i) of the channel (14) is at a location which is distant from the output (14O) of the channel, and the channel comprises (a) a modulator (26) coupled to the input (14I) of the channel (14), for modulating the distortion-encrypted signal ($Y_N$) onto at least one carrier signal and (b) a demodulator (30) coupled to the output of the channel for extracting the distortion-encrypted signal from the at least one carrier signal, and the method further includes the step of performing modulation at the input of the channel, and performing demodulation at the output of the channel at the location remote from the input.

In another version of the method, the (14) channel includes a storage medium, and the method further comprises the step of interposing a delay between the step of applying the distortion-encrypted signal to the input of the channel and the step of extracting the distortion-encrypted signal from the output of the channel. The step of interposing a delay may include the step of recording the distortion-encrypted signal onto a magnetic disk, and playing back the magnetic disk at a time later than the recording.

According to one mode of the method, the step of decrypting the extracted distortion-encrypted signal is performed by a method comprising maximum likelihood sequence estimation. The maximum likelihood sequence estimation may be accomplished by a Viterbi algorithm.

What is claimed is:

1. A method for encrypting digital data for transmission over a channel, where said digital data defines a symbol sample duration, said method comprising the steps of:
   delaying said digital data by at least one delay increment equal to one symbol sample duration, optionally divided by an integer, to thereby generate a plurality of time-sequential signal samples;
   providing a set of distortion encoding keys including at least one nonlinear transfer function;
   operating on each of said time-sequential signal samples by one of said keys which is a nonlinear transfer function, to thereby generate, at any instant, a plurality of distorted samples of said signal;
   summing said plurality of distorted samples of said signal, to thereby generate a distortion-encrypted signal;
   applying said distortion-encrypted signal to an input of said channel;
   extracting said distortion-encrypted signal from an output of said channel, to form an extracted distortion-encrypted signal; and
   decrypting said extracted distortion-encrypted signal.

2. A method according to claim 1, further including, before said step of delaying said error-correction-encoded signal by at least one delay increment, the step of forward error correction encoding said digital data.

3. A method according to claim 1, wherein said set of distortion encoding keys includes at least one nonlinear transfer function in which the coefficients of said nonlinear transfer function vary with time.

4. A method according to claim 1, wherein said set of distortion encoding keys includes at least one nonlinear transfer function in which the coefficients of said nonlinear transfer function vary with time at a recurrence rate corresponding to the bit rate of said digital data.

5. A method according to claim 1, wherein said input of said channel is at a distance from said output of said channel, and said channel comprises (a) a modulator coupled to said input of said channel, for modulating said distortion-encrypted signal onto at least one carrier signal and (b) a demodulator coupled to said output of said channel for extracting said distortion-encrypted signal from said at least one carrier signal, and said method comprises:

performing modulation at said input of said channel, and performing demodulation at said output of said channel at a location remote from said input.

6. A method according to claim 1, wherein said channel includes a storage medium, and said method further comprises the step of interposing a delay between said step of applying said distortion-encrypted signal to said input of said channel and said step of extracting said distortion-encrypted signal from said output of said channel.

7. A method according to claim 6, wherein said step of interposing a delay includes the step of recording said distortion-encrypted signal onto a magnetic disk, and playing back said magnetic disk at a time later than said recording.

8. A method according to claim 6, wherein said step of decrypting said extracted distortion-encrypted signal is performed by a method comprising maximum likelihood sequence estimation.

9. A method according to claim 8, wherein said step of decrypting by a method comprising maximum likelihood sequence estimation includes the step of applying a Viterbi algorithm.

10. A method according to claim 1, wherein said step of providing a set of distortion encoding keys including at least one nonlinear transfer function includes the step of providing at least one of (a) sin x; (b) cos x; (c) exp (j*_*M(k)); where M(k) is a conventional scrambling sequence; (d) {sum of [ai*x^i]}, where the ai are complex constants; and (e) sgn(x) functions.

11. A method according to claim 1, wherein said step of decrypting said extracted distortion-encrypted signal comprises the step of equalization.

12. A method according to claim 11, wherein said equalization step comprises the step of maximum-likelihood-sequence estimation.

13. A method according to claim 12, wherein said step of maximum-likelihood-sequence estimation includes the step of matching the maximum-likelihood-sequence estimation to those steps generating said distortion-encrypted signal from said digital data.

14. A method for encrypting digital data for transmission over a channel, said method comprising the steps of:

delaying said digital data by at least one delay increment, to thereby generate a plurality of time-sequential signal samples;

providing a set of distortion encoding keys including at least one nonlinear transfer function;

operating on each of said time-sequential signal samples by one of said keys which is a nonlinear transfer function, to thereby generate, at any instant, a plurality of phase distorted samples of said signal;

summing said plurality of distorted samples of said signal, to thereby generate a distortion-encrypted signal;

applying said distortion-encrypted signal to an input of said channel;

extracting said distortion-encrypted signal from an output of said channel, to form an extracted distortion-encrypted signal; and decrypting said extracted distortion-encrypted signal.

15. A method for encrypting digital data for transmission over a channel, said method comprising the steps of:

delaying said digital data by at least one delay increment to thereby generate a plurality of time-sequential signal samples;

providing a set of distortion encoding keys including at least one nonlinear transfer function;

in a non-feedback manner, operating on each of said time-sequential signal samples by one of said keys which is a nonlinear transfer function, to thereby generate, at any instant, a plurality of distorted samples of said signal;

summing said plurality of distorted samples of said signal, to thereby generate a distortion-encrypted signal;

applying said distortion-encrypted signal to an input of said channel;

extracting said distortion-encrypted signal from an output of said channel, to form an extracted distortion-encrypted signal; and decrypting said extracted distortion-encrypted signal.

* * * * *